Nov. 30, 1965  C. R. CANTONWINE  3,221,233
SINGLE WINDING, MULTI-PHASE, MULTI-SPEED INDUCTION MOTORS
Filed Feb. 14, 1962  2 Sheets-Sheet 1

INVENTOR
Charles R. Cantonwine

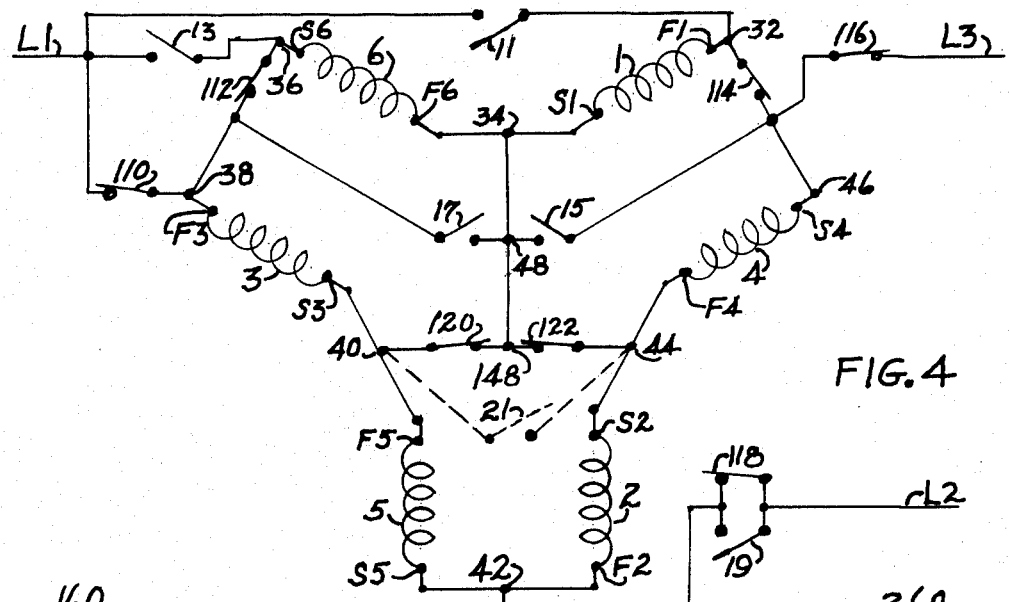
FIG. 4
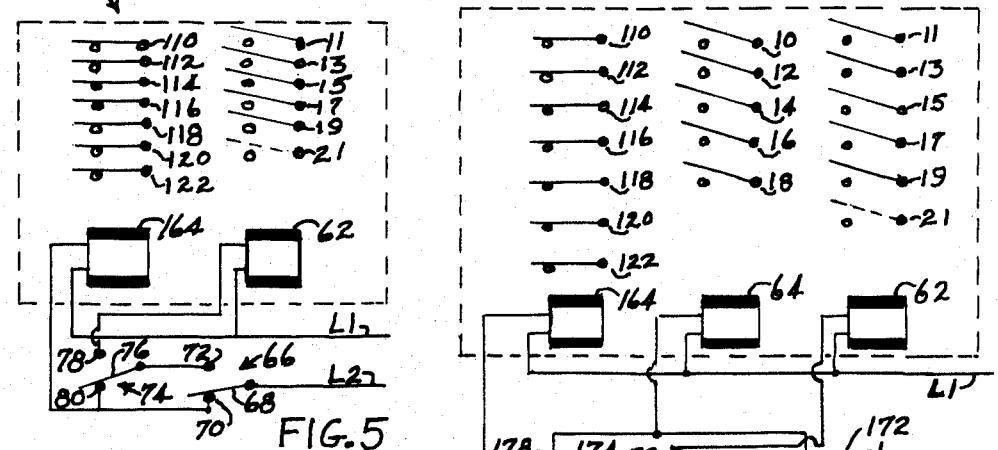
FIG. 5
FIG. 6
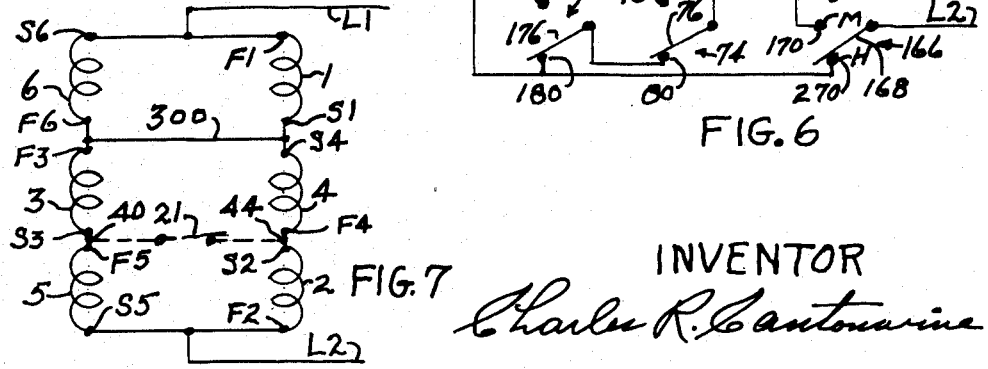
FIG. 7
INVENTOR
Charles R. Cantonwine United States Patent Office 3,221,233
Patented Nov. 30, 1965

3,221,233
SINGLE WINDING, MULTI-PHASE, MULTI-SPEED
INDUCTION MOTORS
Charles R. Cantonwine, 950 Airport Road,
Hot Springs, Ark.
Filed Feb. 14, 1962, Ser. No. 173,158
16 Claims. (Cl. 318—224)

This invention relates to motors in general and more particularly to improvements in alternating current (hereinafter abbreviated A.C.) motors of the pole changing variety and more particularly when the ratio of the number of poles is in the ratio of one to three or two to three.

In the past it has been the practice to provide A.C. motors with separate windings when the speed ratio, of multi-speed motors, is other than 2 to 1 thereby reducing the capacity of the motor.

In my co-pending patent application Serial No. 661,634 filed May 27, 1957 there is described an A.C. motor that uses all of the windings during starting and running and provides a pole changing arrangement wherein the number of poles bear a relation of 1 to 2 having the windings in parallel at the lower number of poles and having the windings in series at the higher number of poles. The present invention is very similar but additionally provides a pole changing relation of 2 to 3.

The present invention overcomes this objectionable feature of known construction by providing a relatively simple motor construction which uses all of the windings in the motor for starting and running when the pole changing arrangement provides three speeds in pole ratios of 1 to 2, 1 to 3 and 2 to 3, or for example, having 2, 4, and 6 poles operating at full output utilizing all of the windings at each speed.

It is therefore a principal object of this invention to provide an A.C. pole changing, multi-speed motor, that employs all of its windings for starting and for running at all speeds.

Another object is to provide an A.C. motor that uses a single winding for a pole changing arrangement having a pole ratio of 1 to 2, 1 to 3, or 2 to 3.

Another object is to improve the starting torque, reduce the starting current and increase the output and efficiency of A.C. motors by means that can be installed as original equipment or added as an improvement on existing motors.

Another object is to eliminate the need for a separate winding on pole changing motors when the pole relation is 1 to 2 to 3.

Another object is to increase the output for a given size motor frame.

Another object is to make more economical use of construction materials in A.C. motors.

These and other objects and advantages of the present invention will become apparent after considering the following detailed specification in conjunction with the accompanying drawings.

In the drawings:

FIG. 4 is a schematic wiring diagram of another form of the electrical circuit for the motor shown in FIG. 1.

FIG. 5 is a schematic wiring diagram of the electrical control circuit for the motor shown in FIGS. 1 and 4.

FIG. 6 is a schematic wiring diagram of the electrical control circuit for the motor shown in FIG. 1 and combined motor circuits shown in FIGS. 2 and 4.

FIG. 7 is a simplified schematic wiring diagram of the electrical circuit for the motor shown in FIGS. 1, 2 and 4 when operating on the single phase connection.

Figure 1:
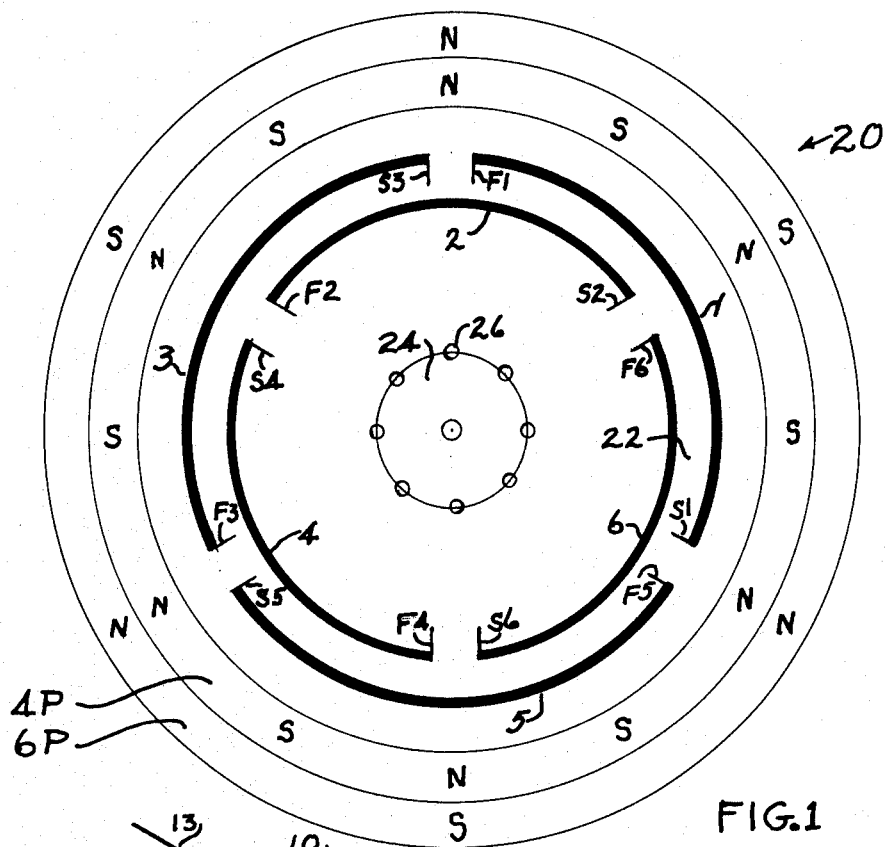
FIG. 1 is a schematic lay-out drawing showing a motor embodying the present invention.

Referring to the drawings by reference numbers, the number 20 in FIG. 1 refers to a motor which has a stator 22 and a rotor 24. The stator 22 has six symmetrically positioned windings designated 1, 2, 3, 4, 5, and 6 and rotor 24 has a winding designated 26.

Figures 2, 3:
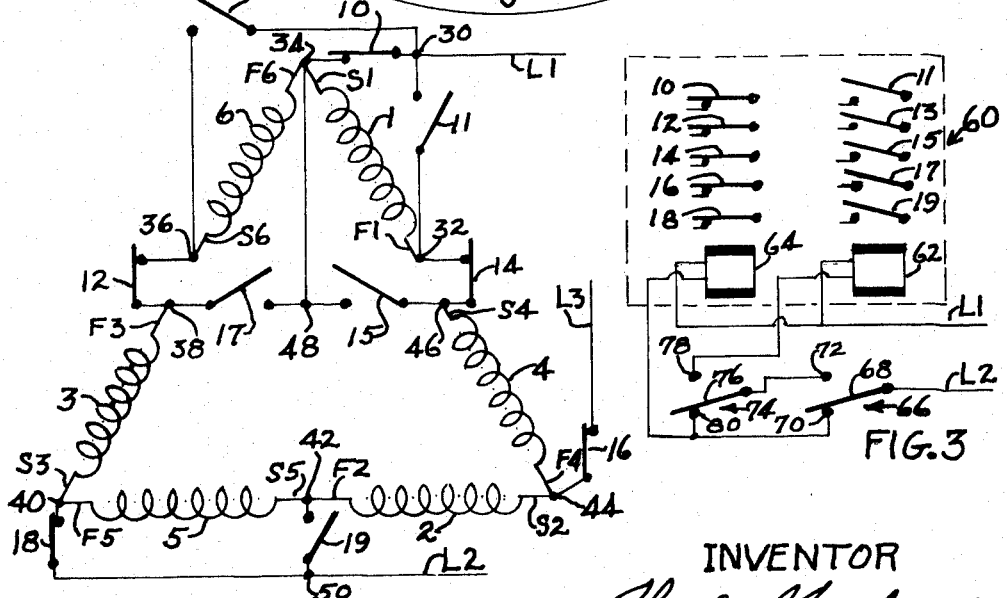
FIG. 2 is a schematic wiring diagram of the electrical circuit for the motor shown in FIG. 1.
FIG. 3 is a schematic wiring diagram of the electrical control circuit for the motor shown in FIGS. 1 and 2.

The motor 20 of FIG. 1 is essentially a 2 pole 3 phase motor as shown. Windings 1 and 4 are opposite each other and constitute the two pole winding groups of one phase, windings 2 and 5 are opposite each other and constitute the two pole winding groups of the second phase, and windings 3 and 6 are opposite each other and constitute the two pole winding groups of the third phase. Each of the said pole winding groups generate salient poles to provide a two pole field. However, each of the pole winding groups of each phase can be connected to provide a 4 pole 3 phase winding by connecting each pole group to have the same polarity thereby generating a salient N (North) pole on the pole axis and as a natural consequence there will be a consequent S (South) pole generated half way between the N poles. This switching from a two pole to a four pole winding can be accomplished by any of the known methods, such as parallel Y for the two pole connection, as shown in FIG. 4, and series delta for the 4 pole connection, as shown in FIG. 2, and so forth. This invention provides a relatively simple means of switching the 4 pole connection, for example, to provide a 6 pole running motor utilizing all of the same windings as used in the 2 pole or 4 pole connection. This circuit can therefore be adapted to operate as a 3 speed motor in the pole ratio of 1, 2, and 3, or as a two speed motor having pole ratios of 1 to 2, 1 to 3, or 2 to 3.

In FIG. 1, the inner circle of polarities designated 4P indicates the polarities of the windings 1-6 when the motor is connected to run as a 4 pole polyphase motor, each of the windings 1-6 generate a salient N pole on its axis and a consequent S pole half way between the two said N poles, which provides a full 4 pole 3 phase starting and running winding.

In FIG. 1, the outer circle of polarities designated 6P indicates the polarities of the windings 1-6 when the motor is connected to run as a 6 pole single phase induction motor after starting on the 2 pole or 4 pole connection. In the 6 pole running connection the windings are connected, as shown in FIG. 7, in two parallel groups, each consisting of 3 pole winding groups connected in series, providing a full composite running winding. Winding 1 generates an S pole, winding 2 generates an N pole, winding 3 generates an S pole, winding 4 generates an N pole, winding 5 generates an S pole, and winding 6 generates an N pole. Since windings 2, 4, and 6 generate salient N poles there will also be three consequent S poles generated half way between the axis of windings 2, 4, and 6, these consequent S poles will fall on approximately the same axis as the salient S poles generated by windings 1, 3, and 5. Likewise the windings 1, 3, and 5 will generate consequent N poles which fall approximately on the same axis as the salient N poles of windings 2, 4, and 6. Therefore the salient poles of windings 1, 3, and 5 will aid the consequent poles of windings 2, 4, and 6, and the salient poles of windings 2, 4, and 6 will aid the consequent poles of windings 1, 3, and 5, providing full output of the windings.

In FIG. 1, the start and finish leads of each of the windings 1-6 is designated as S1 and F1 for the start and finish of winding 1 respectively, and S2 and F2 indicate the start and finish respectively of winding 2 and so on.

FIG. 2 shows the schematic wiring diagram of the motor 20 connected to a source of energy. The diagram is shown in the 4 pole starting and running condition with power leads L1, L2, and L3 supplying energy to the motor 20. The single pole switches, which can be single or double break type, designated as 10, 12, 14, 16, and 18 are ganged to act in unison and are shown in the closed position. The switches designated as 11, 13, 15, 17, and 19 are ganged to act in unison and are shown in the open position. The switches 10, 12, 14, 16, and 18 are adapted to be interlocked with switches 11, 13, 15, 17, and 19 to provide for opening one set of switches even numbered before closing the other set of switches odd numbered.

FIG. 2 as shown provides a known construction 4 pole 3 phase series delta salient-consequent pole connection with lead L1 connected through junction 30 to switch 10 to junction 34, through lead S1 to one end of winding 1 the other end of which is connected by lead F1 to junction 32, through switch 14 to junction 46, and through lead S4 to one end of winding 4 the other end of which is connected by lead F4 to junction 44, and through switch 16 to lead L3. Another circuit from lead L1 is through junction 30 to switch 10 to junction 34 and through lead F6, to one end of winding 6 the other end of which is connected by lead S6 to junction 36, through switch 12 to junction 38 and through lead F3 to one end of winding 3 the other end of which is connected by lead S3 to junction 40 to switch 18 and through junction 50 to lead L2. Another circuit from lead L2 is through junction 50, switch 18 to junction 40 and by lead F5 to one end of winding 5 the other end of which is connected by lead S5 through junction 42 through lead F2 to one end of winding 2 the other end of which is connected by lead S2 through junction 44, switch 16 and to lead L3. Junction 34 is connected to junction 48. The normally open switches 11, 13, 15, 17, and 19 are connected across junctions as follows; switch 11 across junctions 30 and 32, switch 13 across junctions 30 and 36, switch 15 across junctions 46 and 48, switch 17 across junctions 38 and 48, and switch 19 across junctions 42 and 50.

With the switches 10, 12, 14, 16, and 18, in FIG. 2, in the open position and with switches 11, 13, 15, 17, and 19 in the closed position, the windings 1-6 are connected to provide a 6 pole single phase induction run motor having two parallel circuits, as shown in FIG. 7, connected across line leads L1 and L2. A first circuit consists of windings 6, 3, and 5 connected in series and a second circuit consists of windings 1, 4, and 2 connected in series, there is also an incidental cross connection between the first and second circuits whereby F6 and S1 connected at junction 34, is connected together in common with F3 and S4 connection as provided by switches 15 and 17. The said first circuit from line lead L1 is through junction 30, switch 13, to junction 36, through lead S6 to one end of winding 6, the other end of which is connected by lead F6 to junction 34 which is connected to junction 48 and through switch 17 to junction 38 and by lead F3 to one end of winding 3 the other end of which is connected by lead S3 to junction 40 and by lead F5 to one end of winding 5 the other end of which is connected by lead S5 to junction 42, through switch 19, junction 50 and to line lead L2. The said second circuit from line lead L1 is through junction 30, switch 11 to junction 32 and by lead F1 to one end of winding 1 the other end of which is connected by lead S1 to junction 34 which is connected to junction 48, through switch 15, through junction 46 and by lead S4 to one end of winding 4 the other end of which is connected by lead F4 to junction 44, through lead S2 to one end of winding 2 the other end of which is connected by lead F2 to junction 42, through switch 19 to junction 50 and line lead L2. Line lead L3 is disconnected by open switch 16. Another circuit, designated as 300 in FIG. 7, acting as an equalizer, exists between F6 and F3 of the said first circuit and S1 and S4 of the said second circuit, placing windings 1 and 6 in parallel at points of equi-potential. This circuit is from junction 34 to junction 48 to switch 15 to junction 46 and also from junction 48 through switch 17 to junction 38. Although it is not necessary, there is no objection to applying, by switch means, switch 21 as shown optional in dotted lines in FIGS. 4, 5, 6 and 7, or other means, a second cross connection to the remaining two junctions 40 and 44 (FIGS. 2, 4 and 7).

FIG. 3 shows a schematic wiring diagram of the electrical control circuit for the motor 20 of FIGS. 1 and 2, and is shown in the 4 pole starting position. In FIG. 3 the number 60 designates a magnetic switch of conventional construction having 2 sets of switches and 2 actuating solenoids. The left set of switches designated 10, 12, 14, 16, and 18 are closed when solenoid coil 64 is energized, and is the 4 pole connection, and said switches are open when the coil 64 is de-energized. The right set of switches designated 11, 13, 15, 17, and 19 are closed when solenoid coil 62 is energized and is the 6 pole connection, and the said switches are open when coil 62 is de-energized. Furthermore there should be interlocking means provided to prevent both sets of switches closing at the same time.

In FIG. 3 a suitable control voltage supplies energy to leads L1 and L2. Lead L1 is connected to one end of coil 62 and to one end of coil 64. Lead L2 is connected to movable switch blade 68 located on speed selector switch 66, and engages contact 70 which is connected to the other end of coil 64 of magnetic switch 60 and thereby energizing coil 64 which closes the ganged switches 10, 12, 14, 16, and 18 completing the circuit as shown in FIG. 2 to provide a 4 pole 3 phase start and run motor. Switch 74 is a speed responsive switch mounted on the motor 20 having a switch blade 76 engaging stationary contact 80 at speeds below a predetermined speed, and switch blade 76 dis-engaging stationary contact 80 and engaging stationary contact 78 at speeds above a predetermined speed. To operate the motor 20 as a 6 pole motor the switch blade 68 of the selector switch 66 is moved to dis-engage stationary contact 70 and engage stationary contact 72, the line lead L2 is now connected to switch blade 68 of selector switch 66, through contact 72 and to switch blade 76 of speed responsive switch 74, through contact 80 and to one end of coil 64 the other end of which is connected to line lead L1. The motor 20 starts and runs on the 4 pole connection until a predetermined speed is reached, at about the 6 pole speed, when speed responsive switch 74 operates and transfers switch blade 76 from contact 80 to engage with contact 78 which de-energizes coil 64 opening switches 10, 12, 14, 16, and 18 and energizes coil 62 closing the 6 pole running switches 11, 13, 15, 17, and 19. When the switch blade 68 of speed selector switch 66 is at an intermediate point between, and dis-engaged from, contacts 70 and 72 the motor 20 is in the "off" or inoperative position. As shown hereinafter, it is anticipated that, if desired, the 2 pole to 4 pole switching means can be provided in the conventional manner and gang the speed control with speed selector switch 66 to obtain a 3 speed motor having a pole changing ratio of 1 to 2, 1 to 3, or 2 to 3, or in this example, 2, 4, and 6 pole operation on a single winding.

FIG. 4 shows the schematic wiring diagram of the motor 20 connected to a source of energy. The diagram is shown in the 2 pole starting and running condition with power leads L1, L2 and L3 supplying energy to the motor 20. The single pole switches, which can be of the single or double break type, designated as 110, 112, 114, 116, 118, 120, 122 are ganged to act in unison and are shown in the closed position. The switches designated as 11, 13, 15, 17, 19 and 21 are ganged to act in unison and are shown in the open position. The switches 110, 112, 114, 116, 118, 120 and 122 are adapted to be interlocked with switches 11, 13, 15, 17, 19 and 21 to provide for opening one set of said switches even numbered before closing the other set of said switches odd numbered and likewise inversely.

FIG. 4 as shown provides a known construction 2 pole 3 phase parallel Y salient pole connection, with windings 3 and 6 connected in parallel to form a first leg of the Y connection, windings 1 and 4 are connected in parallel to form a second leg of the Y connection, and windings 2 and 5 are connected in parallel to form the third leg of the Y connection. Windings 3 and 6 are connected together at one end by switch 112 and to line lead L1 by switch 110, windings 1 and 4 are connected together at one end by switch 114 and to line lead L3 by switch 116. Windings 2 and 5 are connected together at one end by conductor means at junction 42 and to line lead L2 by switch 118. The other ends of the windings 3, 6, 1, 4, 2, and 5 are all connected together by switches 120 and 122.

In FIG. 4, with the switches 110, 112, 114, 116, 118, 120 and 122 in the open position, and with switches 11, 13, 15, 17, 19, and 21 in the closed position, the windings 1–6 are connected to provide a 6 pole single phase induction run motor exactly as described hereinabove under FIG. 2, and also as shown in FIG. 7.

FIG. 5 shows a schematic wiring diagram of the electrical control circuit for the motor 20 of FIGS. 1 and 4 and is identical to the control circuit of FIG. 3 except for the substitution of switches 110–122 for switches 10, 12, 14, 16, 18 and solenoid coil 164 for solenoid coil 64 and provides a 2 pole 3 phase starting and running connection instead of the 4 pole statring and running connection. The single phase, 6 pole running connection is the same.

FIG. 6 shows a schematic wiring diagram of the electrical control circuit for the motor 20 of FIG. 1 and combined motor circuits of FIGS. 2 and 4, and also shows control circuits of FIGS. 3 and 5 combined to provide a 2 or 3 speed motor.

In FIG. 6 magnetic switch 260 is provided with 3 sets of ganged switches and 3 operating solenoids 62, 64, and 164 when energized engage switches 11, 13, 15, 17, 19 and 21 as one set and switches 10, 12, 14, 16, and 18 as a second set, and switches 110–122 as a third set respectively. The said 3 sets of ganged switches are to be provided with interlocking means to permit the closing of only one set of switches at a time.

In FIG. 6, a suitable control voltage supplies energy to leads L1 and L2. Lead L1 is connected to one end of each of the coils 62, 64 and 164. Lead L2 is connected to movable switch blade 168 located on speed selector switch 166, and engages contact 270 which is connected to the other end of coil 164 of magnetic switch 260 and thereby energizing coil 164 which closes the ganged switches 110–122 completing the circuit as shown in FIG. 4 to provide a 2 pole 3 phase start and run motor. Switch 74 is a speed responsive switch mounted on the motor 20 having a switch blade 76 engaging stationary contact 80 at speeds below a predetermined speed, and switch blade 76 dis-engaging stationary contact 80 and engaging stationary contact 78 at speeds above a predetermined speed. To operate the motor 20 as a 6 pole single phase motor the switch blade 168 of the selector switch 166 is moved to disengage stationary contact 270 and engage stationary contact 172, the line lead L2 is now connected to switch blade 168, through contact 172 and to switch blade 76 of speed responsive switch 74, through contact 80 and to switch blade 176 of starting speed selector switch 174, through stationary contact 180 and through coil 164 and back to line lead L1. The motor starts and runs on the 2 pole connection until a predetermined speed is reached, at about the 6 pole speed, when speed responsive switch 74 operates and transfers switch blade 76 from contact 80 to engage with contact 78 which de-energizes coil 164 opening switches 110–122 and energizes coil 62 closing the 6 pole running switches 11, 13, 15, 17, 19, and 21. When speed selector switch 166 has switch blade 168 engaging contact 270 the motor 20 starts and runs at (H) or high speed on the 2 pole connection of parallel Y 3 phase, when switch blade 168 engages contact 170 the motor 20 starts and runs at (M) or medium speed on the 4 pole series delta 3 phase connection, when the switch blade 168 engages contact 172 the motor starts on either the 2 pole (H) speed or 4 pole (M) speed and runs on the 6 pole (L) speed single phase connection. Starting speed selector switch 174 provides for starting the motor 20 on either the 2 pole or 4 pole connection when the speed selector switch 166 is in the (L) low speed position. When switch blade 176 of starting speed selector switch 174 is engaged with contact 180 the coil 164 is energized and the motor starts as a 2 pole motor whereas if the switch blade 176 is engaging contact 178 the coil 64 is energized and the motor starts as a 4 pole motor.

It should be noted that each pole winding group, windings 1–6 FIGS. 1, 2, 4, and 7, are whole, undivided, phase winding sections and furthermore, as shown in FIG. 1, the magnetic flux axis is maintained in the same relative position at each of the three speeds or at each of the said number 1, 2 and 3 number of poles, and that the flux axis is at the magnetic center of each pole winding group.

Speed responsive switch device 74 of FIGS. 3, 5 and 6 can be of the mechanical governor type or the relay type actuated by changes in motor speed as reflected in a change of voltage or current in any part of the circuit, or even manually operated if desired. Of course the pole changing switches can be operated directly by a centrifugal device if so desired.

It is important to note that the motor 20 is connected as a polyphase motor at the 2 pole and 4 pole connections and will start and run on either of these connections, however, it is anticipated that the motor 20 can be operated from a single phase source of supply through a conventional phase converter, phase converting devices or phase shifting impedance devices, to change the single phase current to polyphase current. This is considered to be the equivalent of a polyphase A.C. source of energy. On the six pole connection the motor is not self starting, but after starting on either the two pole or four pole polyphase connection, it runs as a single phase induction motor utilizing all of, and the same, windings as in the 2 pole and 4 pole connections, and therefore can be properly classified as a single winding 2 or 3 speed motor. Although a 2, 4, and 6 pole 3 speed motor is illustrated and described for reasons of simplicity, it is not limited to this arrangement as the motor 20 can have any number of poles and changing in a pole relation of 1, 2, and 3.

It is also important to note that this disclosure will provide an extremely high starting torque at low starting current by adjusting the rotor resistance to be suitable for the best running torque at the higher number of poles. By starting at the lower number of poles the rotor resistance will be higher in the field of the lower number of poles.

It is anticipated that this construction of motor 20 can provide a means of improving the pull-in torque of synchronous motors by adjusting the speed responsive switch device 74 of FIGS. 3, 5 and 6 to transfer from a starting to a running position at a speed slightly above synchronous speed so the motor can drop into synchronism rather than pull into synchronism.

In FIG. 1, windings 1–6 can be wound having all of the coils in concentric winding arrangement with a different number of turns in some slots as in others to provide a different distribution factor and flux density at one speed than at the other, or they may be wound to have the same number of turns in each slot, and can also be wound concentric, overlap or any known method of placement. Furthermore the coil span is not limited to that illustrated, as the coil span can be at a smaller or greater angle depending on the design requirements.

It is further anticipated that the said stator winding can be on the rotatable member and the said rotor winding can be on the stationary member, and either can be internal relative to the other.

Motor 20 is adaptable to be wound and made connectable alternatively for two different operating voltages as in conventional motor construction.

It is now apparent that there has been provided a novel motor construction which fulfills all of the objects and advantages sought therefor. Furthermore, this invention is intended to cover all changes, alterations and modifications of the examples of the invention herein chosen for purposes of disclosure, which do not constitute departures from the spirit and scope of the invention, and all such changes, alterations and modifications which will be readily apparent to one skilled in the art are contemplated as being within the scope of the present invention which is limited only by the claims which follow.

What I claim is:

1. A three speed A.C. motor comprising a stator having a stator winding thereon and a rotor having a rotor winding thereon, one of said windings having at least two whole pole winding groups per phase arranged for changing the number of poles in the relation of 1, 2, and 3 number of poles, having at the said 1 number of poles at least two whole pole winding groups of each phase connected in parallel and in a polyphase position, and at the said 2 number of poles at least two whole pole winding groups of each phase connected in series and in a polyphase position, and at the said 3 number of poles at least two parallel circuits each consisting of at least three whole pole winding groups connected in series and in a single phase running winding position, and at each of said number of poles all of the coils of the said whole pole winding groups of said one of said windings are energized by an A.C. source of energy, and at each of said number of poles, each of said whole pole winding groups to maintain the same magnetic flux axis in the magnetic center of the said whole pole winding group.

2. A 2 speed A.C. motor comprising a stator having a stator winding thereon and a a rotor having a rotor winding thereon, one of said windings having a plurality of whole pole winding group coils and arranged for changing the number of poles in the relation of to 2 to 3, a speed responsive switch means in conjunction with a speed selector switch means movable between a position to operate at the lower number of poles and another position to operate at the higher number of poles, means including the lower number of poles position of said speed selector switch means conecting the said one of said windings in a series-delta polyphase connection and across an A.C. source of energy to start and run at the lower number of poles, and means including the starting position of said speed responsive switch means in conjunction with the higher number of poles position of said speed selector switch means connecting said one of said windings in a series-delta polyphase connection to start said motor at said lower number of poles and means including the running position of said speed responsive switch means reconnecting all coils of said one of said windings in a series parallel single phase connection and across one phase of said A.C. source to run at the higher number of poles, and at each of said number of poles, each of said whole pole winding group coils to maintain the same magnetic flux axis in the magnetic center of each whole pole winding group coil.

3. An A.C. motor comprising a stator having a stator winding thereon and a rotor having a rotor winding thereon, one of said windings consisting of a plurality of whole winding group coils, and having all of the coils connected for series-delta polyphase operation having a predetermined number of magnetic poles, a switching means having one position comprising not more than five normally closed single pole switches and not more than five normally open single pole switches connected to a polyphase A.C. source of energy and to selected leads of said motor, so that the said normally closed switches connects the said one of said wings for said polyphase operation, and another position of said switching means opening said normally closed switches and closing the said normally open switches so that all of the coils of said one of said windings are recommended to provide a greater number of magnetic poles by connecting said coils in series parallel across one phase of said polyphase A.C. source, said parallel connected windings to be cross connected by means in at least one place on each at points of approximately equi-potential and at said predetermined number of magnetic poles the magnetic flux axis of the said whole pole winding group coils to be on the same axis as at the said greater number of magnetic poles.

4. The motor defined in claim 3 wherein the said predetermined number of magnetic poles and the said greater number of magnetic poles have a ratio of 2 to 3 respectively.

5. An A.C. motor comprising a stator having a stator winding thereon and a rotor having a rotor winding thereon, one of said windings consisting of a plurality of whole pole winding group coils, and having all of the coils connected for a parallel-Y polyphase operation having a predetermined number of magnetic poles, a switching means connected to a polyphase A.C. source of energy and to selected leads of said motor so that one position of said switching means connects the said one of said windings for said polyphase operation, and another position of said switch means connecting said all of said coils of said one of said windings to provide a greater number of magnetic poles by connecting said coils in a series parallel arrangement across one phase of said polyphase A.C. source to provide a full composite single phase running winding, and at said predetermined number of magnetic poles the magnetic flux axis of the said whole pole winding group coils to be on the same axis as at the said greater number of magnetic poles.

6. The motor defined in claim 5 wherein the said predetermined number of magnetic poles and the said greater number of magnetic poles have a ratio of 1 to 3 respectively.

7. An A.C. motor comprising a stator having a stator winding thereon and a rotor having a rotor winding thereon, one of said windings consisting of a plurality of whole pole winding group coils, and having all of the coils connected to provide a polyphase winding having a predetermined number of magnetic poles and connected to a polyphase A.C. source of energy, a switching means to reconnect said all of the coils of said one of said windings to provide a full composite running winding connected across one phase of said A.C. source to operate at a different number of magnetic poles, and at said predetermined number of magnetic poles the magnetic flux axis of the said whole pole winding group coils to be on the same axis as at the said greater number of magnetic poles.

8. The motor defined in claim 7 wherein the said predetermined number of magnetic poles and the said different number of magnetic poles have a ratio of 1 to 3 respectively.

9. The motor defined in claim 7 wherein the said predetermined number of magnetic poles and the said different number of magnetic poles have a ratio of 2 to 3 respectively.

10. The motor defined in claim 7 wherein the distribution factor of said coils be different at said predetermined number of magnetic poles when connected to said polyphase source of energy than it is at said different number of magnetic poles when connected across said one phase as determined by having a different number of conductors in some of the slots than in the others.

11. A three speed motor comprising a stator having a stator winding thereon and a rotor having a rotor winding thereon, one of said windings consisting of a plurality of whole pole winding group coils, and arranged for changing the number of magnetic poles in the relation of 1, 2 and 3 having at the said 1 number of poles the said one of said windings connected by switching means, to provide a polyphase winding, and having at the said 2 number of poles the said one of said windings connected, by switching means to provide a polyphase winding, and having at the said 3 number of poles the said one said windings connected by switching means to provide a single phase induction run winding, a polyphase A.C. source of energy supplying polyphase energy to said polyphase winding connections at the said 1 and 2 number of poles and supplying single phase energy to the said single phase winding at the said 3 number of poles, and at each of the said number of poles all of, and the same, coils of the said one of said windings are energized by the said A.C. source, and will maintain the same magnetic flux axis at each of said number of poles.

12. The motor defined in claim 11 wherein the said polyphase A.C. source of energy be supplied from a single phase A.C. source of energy through a phase converting device whereby the said single phase energy is changed to polyphase energy.

13. A two speed A.C. polyphase single winding induction motor having the said single winding consisting of a plurality of whole pole winding group coils, and arranged to change the number of poles in the ratio of 2 to 3 to provide a full winding polyphase motor at the lower number of poles and to provide a full winding single phase induction motor at the higher number of poles, said motor to start at the said lower number of poles, said two numbers of poles to be obtained by switching means to rearrange the pole winding coils of the said single winding, and the magnetic flux axis of the said whole pole winding group coils to be in the same relative position at the said lower number of poles as at the said higher number of poles.

14. A three speed A.C. polyphase single winding induction motor having the said single windink consisting of a plurality of whole pole winding group coils arranged to change the number of poles in the relation of 1, 2, and 3 to provide a full winding polyphase motor at the said 1 and 2 number of poles and provide a full winding single phase induction motor at the 3 number of poles, said motor to start as a polyphase motor and run at each of the three numbers of poles, said three numbers of poles obtained by switching means to rearrange the said whole pole winding coils of the said single winding, and the magnetic flux axis of the said coils to maintain the same relative position at each of the said number of poles.

15. An A.C. motor comprising a stator having a stator winding thereon and a rotor having a rotor winding thereon, one of said windings having at least six symmetrically positioned whole winding sections, each of said sections comprising at least one whole pole winding group, a switching device movable between a first position, a second position and a third intermediate inoperative position, means including the said switching device first position connecting all of said winding sections together and to the equivalent of a polyphase A.C. source of energy so that the said one of said windings provides a series-delta polyphase winding having twice the number of magnetic poles as said number of whole pole winding groups per phase, to be obtained by connecting said pole winding in a salient-consequent pole arrangement, means including the said switching device second position connecting all of said winding sections in a series parallel arrangement whereby at least three of said whole sections are in series in each of at least two parallel circuits and connected across one phase of said A.C. source to provide a greater number of magnetic poles, said parallel circuits having at least one cross connection between said last named series circuits at points of equipotential, and said magnetic poles to have the same polar axis when connected to said polyphase source of energy as when connected across said one phase of said A.C. source.

16. The motor defined in claim 15 wherein the said twice the number of magnetic poles and the said greater number of magnetic poles have a ratio of 2 to 3 respectively.

References Cited by the Examiner
UNITED STATES PATENTS

| | | | |
|---|---|---|---|
| 2,627,059 | 1/1953 | Noodleman | 318—224 X |
| 2,949,730 | 8/1960 | Kennedy | 318—224 |
| 2,959,721 | 11/1960 | Butler | 318—224 X |

FOREIGN PATENTS

| | | |
|---|---|---|
| 617,340 | 3/1961 | Canada. |

JOHN F. COUCH, *Primary Examiner.*

ORIS L. RADER, *Examiner.*